(12) United States Patent
Lim

(10) Patent No.: US 11,109,012 B2
(45) Date of Patent: Aug. 31, 2021

(54) CARRIAGE OF PCC IN ISOBMFF FOR FLEXIBLE COMBINATION

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/590,108

(22) Filed: Oct. 1, 2019

(65) Prior Publication Data

US 2020/0112709 A1  Apr. 9, 2020

Related U.S. Application Data

(60) Provisional application No. 62/740,519, filed on Oct. 3, 2018.

(51) Int. Cl.

| | | |
|---|---|---|
| *H04N 13/161* | (2018.01) | |
| *H04N 21/236* | (2011.01) | |
| *H04N 21/2343* | (2011.01) | |
| *H04N 21/81* | (2011.01) | |
| *H04N 13/194* | (2018.01) | |
| *H04N 13/106* | (2018.01) | |

(52) U.S. Cl.
CPC ......... *H04N 13/161* (2018.05); *H04N 13/158* (2018.05); *H04N 13/194* (2018.05); *H04N 21/236* (2013.01); *H04N 21/234345* (2013.01); *H04N 21/816* (2013.01)

(58) Field of Classification Search
CPC .. H04N 13/161; H04N 21/236; H04N 13/158; H04N 21/816; H04N 13/194; H04N 21/234345; H04N 13/178; H04N 21/2353; H04N 21/85406; H04N 21/234309
See application file for complete search history.

(56) References Cited

U.S. PATENT DOCUMENTS

| | | | |
|---|---|---|---|
| 2018/0268570 A1 | 9/2018 | Budagavi et al. | |
| 2020/0112745 A1* | 4/2020 | Joshi | .......... H04N 13/275 |
| 2020/0153885 A1* | 5/2020 | Lee | .......... G06T 9/001 |

FOREIGN PATENT DOCUMENTS

CN   106331676 A   1/2017

OTHER PUBLICATIONS

Mammou et al. (Eds.), "Second Working draft for Video-based Point Cloud Coding", ISO/IEC JTC1/SC29/WG11 MPEG 2018/N17771, Jul. 2018, 45 pages.

"First idea on Systems technologies for Point Cloud Coding", ISO/IEC JTC1/SC291/WG11 MPEG2018/w17675, Apr. 2018, 6 pages.

(Continued)

*Primary Examiner* — Sath V Perungavoor
*Assistant Examiner* — Tyler B Edwards

(57) ABSTRACT

An electronic device, non-transitory computer readable medium and a method for point cloud compression (PCC) is provided. The method includes receiving a PCC stream; mapping the PCC stream to a plurality of video ISO base media file format (ISOBMFF) streams; generating a ISOBMFF elementary stream including configuration information indicating a logical grouping of the plurality of video ISOBMFF streams into the PCC stream; and transmitting the ISOBMFF elementary stream and the plurality of video ISOBMFF streams to a client device.

20 Claims, 5 Drawing Sheets

(56) References Cited

OTHER PUBLICATIONS

Olivier Devillers et al., "Geometric Compression for Interactive Transmission", Oct. 13, 2000, 8 pages.
Yan Huang et al., "Octree-Based Progressive Geometry Coding of Point Clouds", Eurographics Symposium on Point-Based Graphics, Jul. 2006, 9 pages.
R. Skupin et al., "Standardization Status of 360 degree Video Coding and Delivery", VCIP, Dec. 10-13, 2017, 4 pages.
International Search Report dated Jan. 21, 2020 in connection with International Patent Application No. PCT/KR2019/012953, 3 pages.
Written Opinion of the International Searching Authority dated Jan. 21, 2020 in connection with International Patent Application No. PCT/KR2019/012953, 4 pages.

\* cited by examiner

CARRIAGE OF PCC IN ISOBMFF FOR FLEXIBLE COMBINATION

CROSS-REFERENCE TO RELATED APPLICATION AND CLAIM OF PRIORITY

This application claims priority under 35 U.S.C. § 119(e) to U.S. Provisional Patent Application No. 62/740,519 filed on Oct. 3, 2018. The above-identified provisional patent applications are hereby incorporated by reference in its entirety.

TECHNICAL FIELD

This disclosure relates generally to encoding and decoding multimedia data. More specifically, this disclosure relates to using a carriage of point cloud compression (PCC) in the international organization for standardization (ISO) base media file format (ISOBMFF).

BACKGROUND

As MPEG PCC is using 2D Video codecs to encode some of PCC data, it requires more than one video decoders there is a need to decide combination of video codecs at the time of delivery or decoding instead of the time creating the file. But the format currently specified in the latest MPEG PCC Working Draft does not support such a use case efficiently, as all data is interleaved into a single bitstream.

SUMMARY

This disclosure provides 3D point cloud compression systems for carriage of a PCC stream in ISOBMFF for flexible combination.

In a first embodiment, a server for point cloud compression (PCC) is provided. The server includes a processor and a memory. The processor receives a PCC stream; maps the PCC stream to a plurality of video ISO base media file format (ISOBMFF) streams; generates a ISOBMFF elementary stream including configuration information indicating a logical grouping of the plurality of video ISOBMFF streams into the PCC stream; and transmits the ISOBMFF elementary stream and the plurality of video ISOBMFF streams to a client device.

In another embodiment, a method for point cloud compression (PCC) is provided. The method includes receiving a PCC stream; mapping the PCC stream to a plurality of video ISO base media file format (ISOBMFF) streams; generating a ISOBMFF elementary stream including configuration information indicating a logical grouping of the plurality of video ISOBMFF streams into the PCC stream; and transmitting the ISOBMFF elementary stream and the plurality of video ISOBMFF streams to a client device.

In yet another embodiment, a non-transitory computer readable medium for point cloud compression (PCC) is provided. The non-transitory computer readable medium embodying a computer program, the computer program comprising computer readable program code that, when executed by a processor of an electronic device, causes the processor to receive a point cloud compression (PCC) stream; map the PCC stream to a plurality of video ISO base media file format (ISOBMFF) streams; generate a ISOBMFF elementary stream including configuration information indicating a logical grouping of the plurality of video ISOBMFF streams into the PCC stream; and transmit the ISOBMFF elementary stream and the plurality of video ISOBMFF streams to a client device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

This application provides detailed design for storage of V-PCC data in ISOBMFF. Considering the main philosophy of the current V-PCC codec design is reuse of existing video codecs to compress major components of PCC data, this contribution proposes to reuse existing ISOBMFF design for storage of PCC data encoded with existing video codec, codecs under development, and any codecs to be developed in the future.

Another important feature considered by this application is supporting flexible combination of encoded PCC data at the delivery or decoding time, a.k.a. late binding. Even though current PCC codec encoders mainly use high efficiency video coding (HEVC) as a video compression codec, the design of PCC compression is not limited to the use of HEVC. PCC data can be encoded with previously developed video codecs, such as advanced video coding (AVC), or video codecs under the development, such as versatile video coding (VVC). In addition, all PCC data does not have to be encoded with same video codec with the same profile and level, as the combination of codecs supported by the devices in the market can vary. The design in this application enables storage of multiple versions of the same PCC data encoded with various video codec profile and level selection and allows selection of a combination of them at the time of delivery or decoding according to the capabilities of the PCC decoder.

Figure 1:
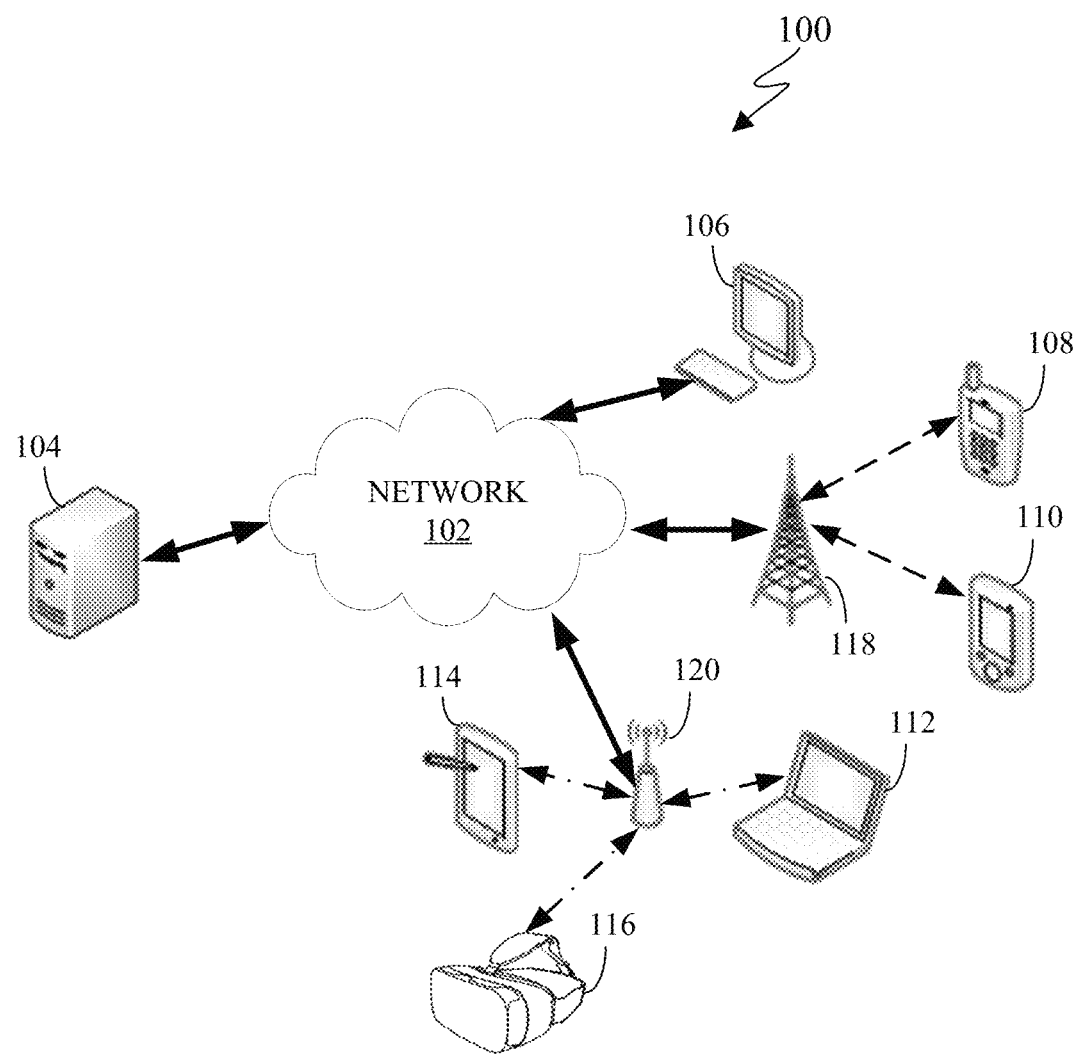
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 includes can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a metadata elementary stream and a plurality of video data elementary streams, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate the PCC file, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and server 104

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a PCC file and then transmit the PCC file to one or more of the client devices 106-116. For another example, one of the client devices 106-116 can compress a 3D point cloud to generate the PCC file and then transmit the PCC file to another one of the client device 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
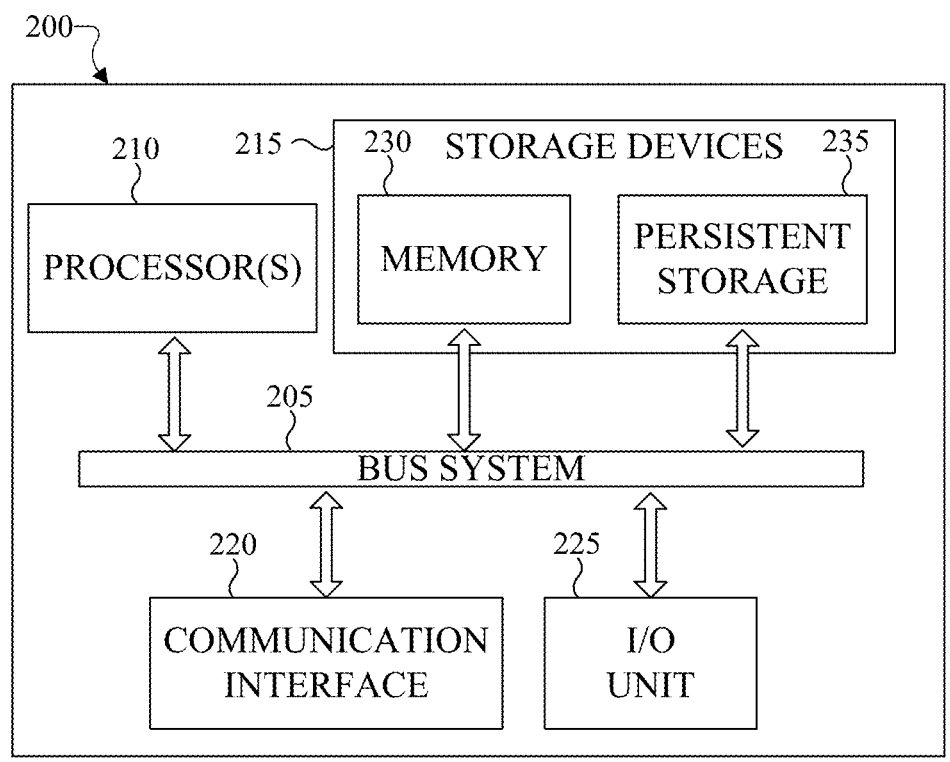
FIGS. 2 and 3 illustrate example electronic devices in accordance with an embodiment of this disclosure.
Figure 3:
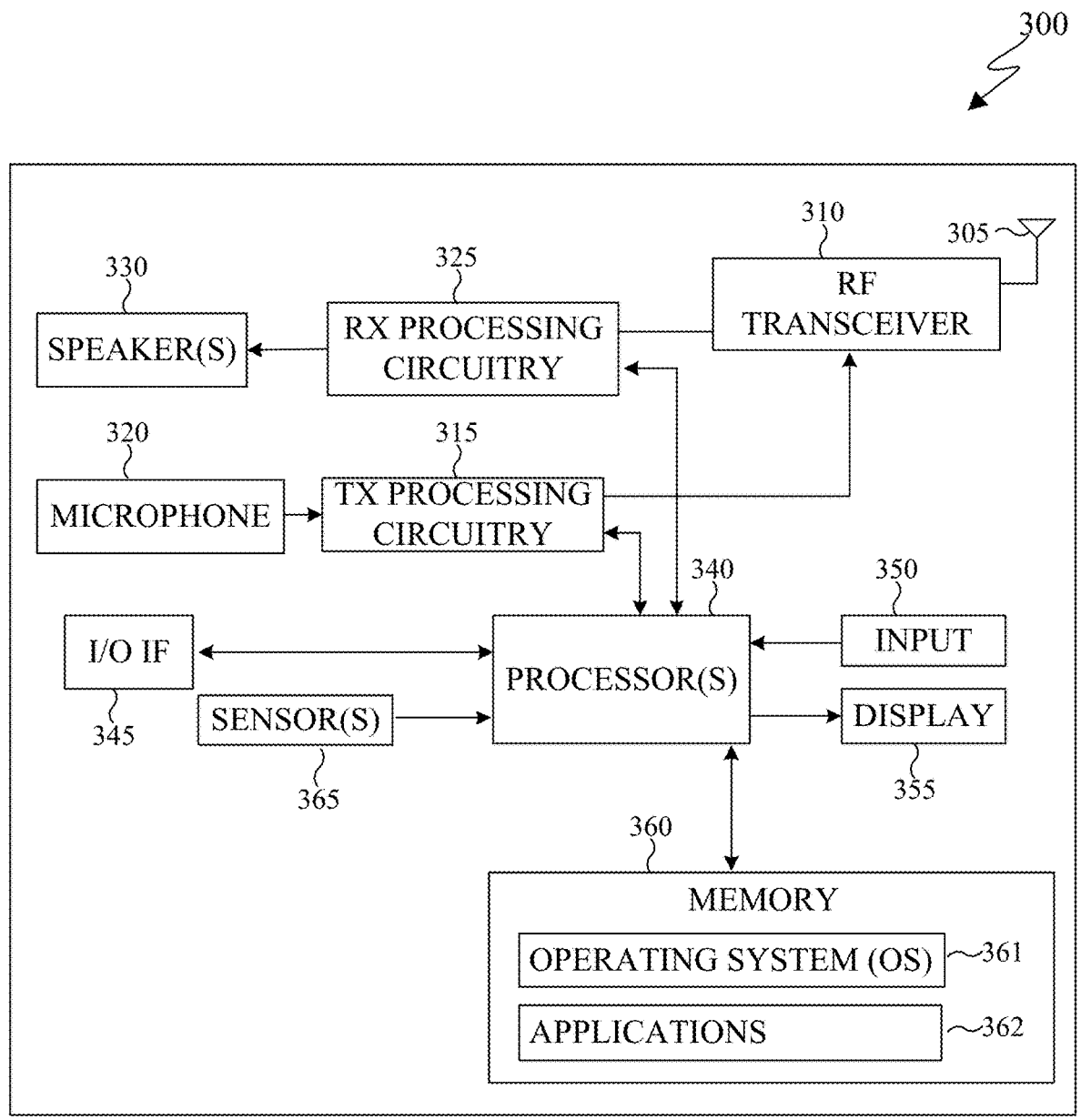

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for receiving a point cloud compression (PCC) stream, instructions for mapping the PCC stream to a plurality of video ISO base media file format (ISOBMFF) streams, instructions for generating a ISOBMFF elementary stream including configuration information indicating a logical grouping of the plurality of video ISOBMFF streams into the PCC stream, as well as instructions for transmit the ISOBMFF elementary stream and the plurality of video ISOBMFF streams to a client device. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a PCC file to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
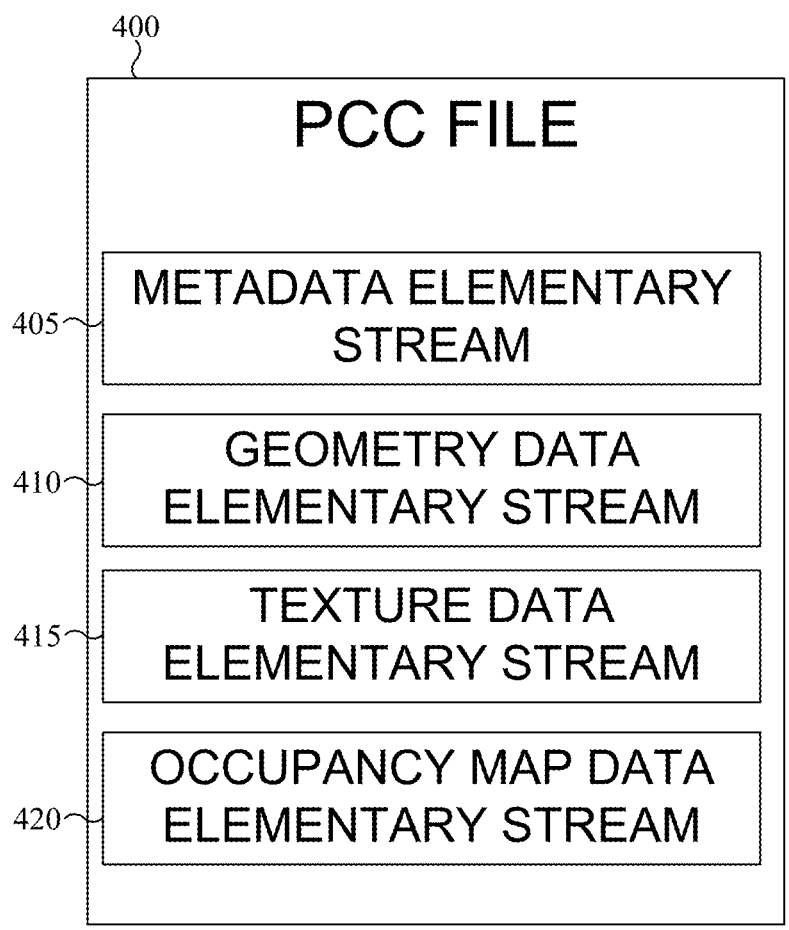
FIG. 4 illustrates a block diagram of an example structure of a PCC file in accordance with an embodiment of this disclosure.

FIG. 4 illustrates a block diagram of an example structure of a PCC file 400 in accordance with an embodiment of this disclosure. The embodiment of FIG. 4 is for illustration only. Other embodiments can be used without departing from the scope of this disclosure.

FIG. 4 specifies the carriage of PCC data in the ISO base media file format. As compressed PC data is composed of multiple 2D video bit streams and metadata, it is stored in multiple tracks. As PC data compression employs multiple independent codecs, several types of elementary streams are defined for storing PCC content. The PCC file 400 can include one or more metadata elementary streams 405, one or more geometry data elementary streams 410, one or more texture data elementary streams 415, and one or more occupancy map data elementary streams 420.

The metadata elementary stream 405 can include PCC parameter sets and other compressed metadata, such as frame auxiliary information, an occupancy map, and a list of other elementary streams comprising a compressed point cloud. The PCC parameter sets include parameters that link the frames in the video streams to form a PCC frame.

The geometry data elementary stream 410 can include geometry of a point cloud encoded with a two-dimensional (2D) video codec. The texture data elementary stream 415 can include a texture of a point cloud encoded with a 2D video codec. The occupancy map data elementary stream 420 can include the occupancy map of a point cloud encoded with 2D video codec.

The geometry data elementary stream 410, the texture data elementary stream 415, and the occupancy map data elementary stream 420 are compliant to the 2D video codec utilized, respectively, and are stored as compliant 2D video media tracks. The metadata elementary stream 405 can include an entry point of point cloud data decoding and can include references to the geometry data elementary stream 410, the texture data elementary stream 415, and occupancy map data elementary stream 420.

The samples of frame auxiliary information, occupancy map frames, geometry frames and texture frames comprising a single PC frame shall have same decoding time. The PCC parameter sets used for such samples shall have a decoding time equal or prior to such decoding time.

The PCC track reference box can be defined as:
Box Type: 'pctr'
Container: TrackBox
Mandatory: Yes
Quantity: One The PCC track reference box can provide a list of tracks containing geometry data, texture data and occupancy map data. For flexible configuration of PCC contents supporting variety of the client capabilities, multiple versions of encoded data with various video codecs, profiles and levels, and stream type representations (e.g. whether the stream contains both d0 and d1 frames, or only one frame type), and lossless encoding support are provided. An example of a data structure for the PCC file 400 is provided below.

```
aligned(8) class PCCTrackReferenceBox( ) extends Box ('pctr') {
    unsigned int(8) numOfDataTrackReferences;
    for (i=0; i< numOfDataTrackReferences; i++) {
        unsigned int(4)     DataType;
        unsigned int(4)     VideoCodecType;
        unsigned int(8)     VideoProfileIndication;
        unsigned int(8)     VideoLevelIndication;
        unsigned int(1)     lossless;
        bit(7)              reserved = 0;
    unsigned int(32)        track_ID;
```

Where the "numOfDataTrackReferences" variable can indicate a number of track references described in the PCC track reference box. The "DataType" variable can indicate a type of PCC data in the reference tracked as listed in Table 1.

TABLE 1

PCC Data Types

| value | PCC Data Type |
| --- | --- |
| 0x00 | reserved for ISO use |
| 0x01 | geometry d0 video stream |
| 0x02 | geometry d1 video stream |
| 0x03 | texture video stream |
| 0x04 | occupancy map video stream |
| 0x05~0x0E | reserved for ISO use |

The "VideoCodeType" variable can indicate a type of the video coding standard used to encode the PCC data in the referenced track as listed in Table 2. The "VideoProfileIndication" variable can contain a profile_idc of the video coding standard listed in Table 2 used to encode PCC data in the referenced track. The "VideoLevelIndication" variable can contain level_idc of the video coding standard listed in Table 2 used to encode the PCC data in the referenced track.

TABLE 2

Supported video codec types and sample entry names

| value | video coding specification | sample entry names |
| --- | --- | --- |
| 0x00 | reserved for ISO use | |
| 0x01 | ISO/IEC 23008-2 | hevc, hev1, . . . |
| 0x02 | ISO/IEC 14496-10 | avc1, avc2, . . . |
| 0x03 | ISO/IEC 23090-2 | |
| 0x04~0x0E | reserved for ISO use | |

The "lossless" variable can indicate lossless encoding of the PCC data in the referenced track. The "track ID" variable can indicate the track identifier of the referenced track. The value 0 may not be present. A given value may not be duplicated in this box.

The PCC decoder configuration record can provide an indication of profile and level of the PCC decoder required to decode the elementary streams. The PCC decoder compliant to the profile and level indicated by this profile and level is able to decode all elementary streams in this file regardless of the video profile and level to which each elementary stream is complaint. For example, The PCC decoder configuration record can provide a version indication. The non-limiting example below uses version 1 of the PCC decoded configuration record. Any changes which cannot be decoded by the decoder compliant to version 1 can use a new value of this field. For example, the syntax of the PCC decoder configuration record can include the following.

```
aligned(8) class PCCDecoderConfigurationRecord {
    unsigned int(8) configurationVersion = 1;
    unsigned int(8) PCCProfileIndication;
    unsigned int(8) PCCLevelIndication;
```

The "configurationVersion" variable can indicate a version of this record. The "PCCProfileIndication" variable can include a profile_idc of the PCC standard. The "PCCLevelIndication" variable can contain a level_idc of the PCC standard. The PCC data compressed with a video coding standard shall be stored in a track whose sample entry is one of the PCC listed in the same row of the table.

Figure 5:
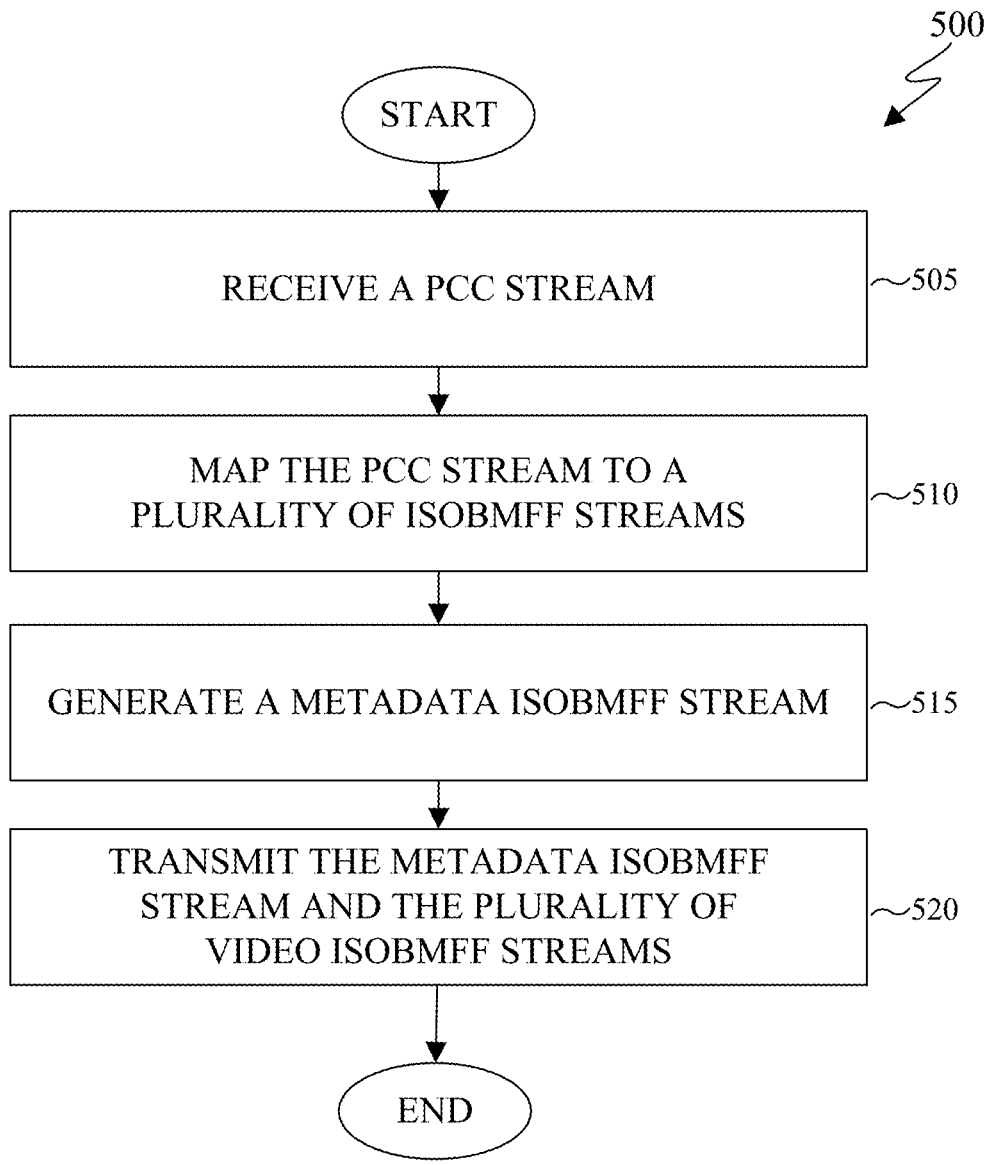
FIG. 5 illustrates an example method for generating a PCC stream in ISOBMFF format in accordance with an embodiment of this disclosure.

FIG. 5 illustrates an example method 500 for generating a PCC stream in ISOBMFF format in accordance with an embodiment of this disclosure. The method 500 can be performed by the server 104 or any of the client devices 106-116 of FIG. 1, the server 200 of FIG. 2, the electronic device 300 of FIG. 3, or any other suitable device or system. For ease of explanation, the method 500 is described as being performed by the electronic device 300 of FIG. 3.

In step 505, the electronic device 300 can receive a PCC stream. The PCC stream can be received through wired or wireless communication or can be received from storage, such as a memory.

In step 510 the electronic device 300 can map the PCC stream to a plurality of video ISOBMFF streams. The PCC stream can be mapped to a plurality of 2D video streams, including a map data elementary stream, a geometry data elementary stream, a texture data elementary stream, and an occupancy map data elementary stream.

In step 515, the electronic device 300 can generate a metadata ISOBMFF elementary stream including configuration information indicating a logical grouping of the plurality of video ISOBMFF streams into the PCC stream. The metadata in the metadata elementary stream can be used to provide an entry point of cloud data decoding and also provide reference to the geometry, texture, and occupancy map elementary data streams.

The frame auxiliary information from the metadata ISOBMFF elementary stream, the geometry frame from the geometry data elementary stream, a texture frame from the texture data elementary stream, and an occupancy map frame from the occupancy map data elementary stream all have a same decoding time. The PCC parameter set used for the frame auxiliary information has a decoding time equal to or prior to a decoding time for the frame auxiliary information.

In step 520, the electronic device 300 can transmit the metadata ISOBMFF elementary stream and the plurality of video ISOBMFF streams to a client device.

Although FIG. 5 illustrates one example of a method 500 for generating a PCC stream in ISOBMFF format, various changes may be made to FIG. 5. For example, while shown as a series of steps, various steps in FIG. 5 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A server for creating a point cloud compression (PCC) file, the server comprising:
   a memory; and
   a processor coupled to the memory, the processor configured to:
   receive a compressed PCC stream;
   map the PCC stream to a plurality of video ISO base media file format (ISOBMFF) streams;
   generate a ISOBMFF elementary stream including configuration information indicating a logical grouping of the plurality of video ISOBMFF streams into the PCC stream, wherein the ISOBMFF elementary stream includes a PCC track reference box that provides a list of tracks containing geometry data, texture data, and an occupancy map; and
   transmit, via a communication interface, the ISOBMFF elementary stream and the plurality of video ISOBMFF streams to a client device.

2. The server of claim 1, wherein the ISOBMFF elementary stream further includes an entry point of PCC data decoding.

3. The server of claim 1, wherein the plurality of video ISOBMFF streams includes:
   a geometry data elementary stream that includes the geometry data of the PCC stream encoded with a two-dimensional (2D) video codec,
   a texture data elementary stream that includes the texture data of the PCC stream encoded with the 2D video codec, and
   an occupancy map data elementary stream that includes the occupancy map for the geometry data and the texture data of the PCC stream, the occupancy map encoded with the 2D video codec.

4. The server of claim 3, wherein frame auxiliary information from the ISOBMFF elementary stream, a geometry frame from the geometry data elementary stream, a texture frame from the texture data elementary stream, and an occupancy map frame from the occupancy map data elementary stream all have a same decoding time.

5. The server of claim 3, wherein the ISOBMFF elementary stream includes a PCC parameter set, frame auxiliary information, and a list of video streams mapped from the PCC stream.

6. The server of claim 5, wherein a PCC parameter set used for the frame auxiliary information has a decoding time equal or prior to a decoding time for the frame auxiliary information.

7. The server of claim 4, wherein PCC parameter sets used for the geometry frame, the texture frame, and the occupancy map frame have decoding times equal or prior to a decoding time for the geometry frame, the texture frame, and the occupancy map frame.

8. A method for sending point cloud compression (PCC) data, the method comprising:
  receiving a point cloud compression (PCC) stream;
  mapping the PCC stream to a plurality of video ISO base media file format (ISOBMFF) streams;
  generating a ISOBMFF elementary stream including configuration information indicating a logical grouping of the plurality of video ISOBMFF streams into the PCC stream, wherein the ISOBMFF elementary stream includes a PCC track reference box that provides a list of tracks containing geometry data, texture data, and an occupancy map; and
  transmitting the ISOBMFF elementary stream and the plurality of video ISOBMFF streams to a client device.

9. The method of claim 8, wherein the ISOBMFF elementary stream further includes an entry point of PCC data decoding.

10. The method of claim 8, wherein the plurality of video ISOBMFF streams includes:
  a geometry data elementary stream that includes the geometry data of the PCC stream encoded with a two-dimensional (2D) video codec,
  a texture data elementary stream that includes the texture data of the PCC stream encoded with the 2D video codec, and
  an occupancy map data elementary stream that includes the occupancy map for the geometry data and the texture data of the PCC stream, the occupancy map encoded with the 2D video codec.

11. The method of claim 10, wherein frame auxiliary information from the ISOBMFF elementary stream, a geometry frame from the geometry data elementary stream, a texture frame from the texture data elementary stream, and an occupancy map frame from the occupancy map data elementary stream all have a same decoding time.

12. The method of claim 10, wherein the ISOBMFF elementary stream includes a PCC parameter set, frame auxiliary information, and a list of video streams mapped from the PCC stream.

13. The method of claim 12, wherein a PCC parameter set used for the frame auxiliary information has a decoding time equal or prior to a decoding time for the frame auxiliary information.

14. The method of claim 11, wherein PCC parameter sets used for the geometry frame, the texture frame, and the occupancy map frame have decoding times equal or prior to a decoding time for the geometry frame, the texture frame, and the occupancy map frame.

15. A non-transitory computer readable medium embodying a computer program, the computer program comprising computer readable program code that, when executed by a processor of an electronic device, causes the electronic device to:
  receive a point cloud compression (PCC) stream;
  map the PCC stream to a plurality of video ISO base media file format (ISOBMFF) streams;
  generate a ISOBMFF elementary stream including configuration information indicating a logical grouping of the plurality of video ISOBMFF streams into the PCC stream, wherein the ISOBMFF elementary stream includes a PCC track reference box that provides a list of tracks containing geometry data, texture data, and an occupancy map; and
  transmit the ISOBMFF elementary stream and the plurality of video ISOBMFF streams to a client device.

16. The non-transitory computer readable medium of claim 15, wherein the ISOBMFF elementary stream further includes an entry point of PCC data decoding.

17. The non-transitory computer readable medium of claim 15, wherein the plurality of video ISOBMFF streams includes:
  a geometry data elementary stream that includes the geometry data of the PCC stream encoded with a two-dimensional (2D) video codec,
  a texture data elementary stream that includes the texture data of the PCC stream encoded with the 2D video codec, and
  an occupancy map data elementary stream that includes the occupancy map for the geometry data and the texture data of the PCC stream, the occupancy map encoded with the 2D video codec.

18. The non-transitory computer readable medium of claim 17, wherein frame auxiliary information from the ISOBMFF elementary stream, a geometry frame from the geometry data elementary stream, a texture frame from the texture data elementary stream, and an occupancy map frame from the occupancy map data elementary stream all have a same decoding time.

19. The non-transitory computer readable medium of claim 17, wherein the ISOBMFF elementary stream includes a PCC parameter set, frame auxiliary information, and a list of video streams mapped from the PCC stream.

20. The non-transitory computer readable medium of claim 19, wherein a PCC parameter set used for the frame auxiliary information has a decoding time equal or prior to a decoding time for the frame auxiliary information.

* * * * *